(12) United States Patent
Su

(10) Patent No.: US 11,962,637 B2
(45) Date of Patent: Apr. 16, 2024

(54) MESSAGE DISPLAY METHOD AND DEVICE, AND STORAGE MEDIUM

(71) Applicant: LIANSHANG (XINCHANG) NETWORK TECHNOLOGY CO., LTD., Shaoxing (CN)

(72) Inventor: Yong Su, Shaoxing (CN)

(73) Assignee: LIANSHANG (XINCHANG) NETWORK TECHNOLOGY CO., LTD., Shaoxing (CN)

( * ) Notice: Subject to any disclaimer, the term of this patent is extended or adjusted under 35 U.S.C. 154(b) by 441 days.

(21) Appl. No.: 17/037,778

(22) Filed: Sep. 30, 2020

(65) Prior Publication Data

US 2021/0014298 A1 Jan. 14, 2021

Related U.S. Application Data

(63) Continuation of application No. PCT/CN2018/125614, filed on Dec. 29, 2018.

(30) Foreign Application Priority Data

Mar. 30, 2018 (CN) .......................... 201810310786.5

(51) Int. Cl.
*H04L 67/02* (2022.01)
*H04L 67/561* (2022.01)
*H04L 67/568* (2022.01)

(52) U.S. Cl.
CPC ............ *H04L 67/02* (2013.01); *H04L 67/561* (2022.05); *H04L 67/568* (2022.05)

(58) Field of Classification Search
CPC ................... H04L 67/50–67/568; H04L 67/02
See application file for complete search history.

(56) References Cited

U.S. PATENT DOCUMENTS 7,587,398 B1 * 9/2009 Fredricksen .......... G06F 16/957
8,224,964 B1 * 7/2012 Fredrickson ........ H04L 67/1097
709/227

(Continued)

FOREIGN PATENT DOCUMENTS

| CN | 101539911 A | 9/2009 |
| CN | 104965717 A | 10/2015 |
| CN | 108600342 A | 9/2018 |

*Primary Examiner* — Clayton R Williams
(74) *Attorney, Agent, or Firm* — Bayramoglu Law Offices LLC

(57) ABSTRACT

A message display method includes: caching, by a server, a message display page according to each original URL, extracting a fingerprint feature, and generating an alternative URL, then detecting a display status of each message at a preset time interval and marking the display status, and when receiving a display information obtaining request from a client, sending the fingerprint feature, the original URL, or the alternative URL of each message to the client according to a currently marked display status; and when receiving a message access request of a user, determining, by the client, a type of a corresponding URL, and if the corresponding URL is an alternative URL, displaying the message to the user, or if the corresponding URL is an original URL, determining whether the message is displayed normally, and if yes, displaying the message to the user.

13 Claims, 5 Drawing Sheets

---

101: A server caches a corresponding message display page according to an original URL of each message, and generates a corresponding alternative URL

↓

102: The server receives a display information obtaining request sent by a client, and sends the original URL and/or the alternative URL of each message to the client, so that the client can display each message

(56) References Cited

U.S. PATENT DOCUMENTS

| | | | |
|---|---|---|---|
| 2002/0143888 A1* | 10/2002 | Lisiecki | H04L 67/1095 709/217 |
| 2002/0143933 A1* | 10/2002 | Hind | H04L 67/02 709/224 |
| 2010/0083078 A1 | 4/2010 | Asai | |
| 2012/0137210 A1* | 5/2012 | Dillon | G06F 16/9574 715/234 |
| 2015/0039674 A1* | 2/2015 | Agarwal | H04L 67/568 709/203 |
| 2015/0310126 A1* | 10/2015 | Steiner | G06F 16/9574 715/204 |

* cited by examiner

MESSAGE DISPLAY METHOD AND DEVICE, AND STORAGE MEDIUM

CROSS REFERENCE TO THE RELATED APPLICATIONS

This application is the continuation application of International Application No. PCT/CN2018/125614, filed on Dec. 29, 2018, which is based upon and claims priority to Chinese Patent Application No. 201810310786.5, filed on Mar. 30, 2018, the entire contents of which are incorporated herein by reference.

TECHNICAL FIELD

The present invention relates to the technical field of data processing, and in particular, to a message display method and device, and a storage medium.

BACKGROUND

With the rapid development of science and technology, the Internet has spread all over the world. People can learn all kinds of news by browsing the web, such as current affairs, politics, news, sports, entertainment, and shopping, which brings many conveniences to people's lives. At present, for aggregated message pages of many clients, due to copyright issues, each message provider usually provides a Uniform Resource Locator (URL) of a corresponding message, and a client accesses a display page of the corresponding message according to the URL, instead of allowing message content to be captured and displayed directly. However, in this manner, the message cannot be displayed normally on the client due to a failure in a server of the message provider, thereby degrading user experience.

SUMMARY

In order to resolve the shortcomings in the prior art, the present invention provides a message display method and device, and a storage medium.

In a first aspect, the present invention provides a message display method applied to a server, including:
  caching, by the server, a corresponding message display page according to an original URL of each message, and generating a corresponding alternative URL; and
  receiving, by the server, a display information obtaining request sent by a client, and sending the original URL and/or the alternative URL of each message to the client, so that the client can display each message.

Optionally, the caching, by the server, a corresponding message display page according to an original URL of each message includes: caching, by the server, the corresponding message display page according to the original URL of each message, and extracting a fingerprint feature in the message display page; and
  correspondingly, the sending the original URL and/or the alternative URL of each message to the client includes: correspondingly sending the original URL and the alternative URL, and the fingerprint feature of each message to the client.

Optionally, after the generating a corresponding alternative URL, the method further includes: detecting, by the server, a display status of each message at a preset time interval and marking the display status; and
  correspondingly, the sending the original URL and/or the alternative URL of each message to the client includes: sending, by the server, the original URL or the alternative URL of each message to the client according to a currently marked display status of each message.

Optionally, the detecting, by the server, a display status of each message at a preset time interval and marking the display status includes: accessing, by the server, the corresponding message display page according to the original URL of each message at the preset time interval, and marking the original URL, and/or a message title, and/or a message identifier of each message according to a display status of the message display page.

Optionally, the sending, by the server, the original URL or the alternative URL of each message to the client according to a currently marked display status of each message includes: determining, by the server according to the currently marked display status of each message, whether there is currently an abnormally displayed message, and if yes, sending an alternative URL of the abnormally displayed message and an original URL of a normally displayed message to the client; otherwise, sending the original URL of each message to the client.

Optionally, the caching, by the server, a corresponding message display page according to an original URL of each message includes: caching, by the server, the corresponding message display page according to the original URL of each message, and extracting a fingerprint feature in the message display page; and
  correspondingly, the sending the original URL or the alternative URL of each message to the client includes: correspondingly sending the original URL or the alternative URL of each message, and the fingerprint feature to the client.

Optionally, the caching, by the server, a corresponding message display page according to an original URL of each message includes: caching, by the server, the corresponding message display page according to the original URL of each message, and extracting a fingerprint feature in the message display page; and
  correspondingly, the sending the original URL and/or the alternative URL of each message to the client includes: correspondingly sending the original URL of each message and the fingerprint feature to the client.

Optionally, the method further includes: receiving, by the server, an alternative-URL obtaining request sent by the client, searching for the corresponding alternative URL according to the alternative-URL obtaining request, and sending the alternative URL to the client.

Optionally, after the generating a corresponding alternative URL, the method further includes: correspondingly storing the alternative URL, the fingerprint feature, and the message identifier and/or the message title of each message.

In a second aspect, the present invention provides a message display method applied to a client, including:
  sending, by the client, a display information obtaining request to a server, and receiving a fingerprint feature, an original URL, and an alternative URL of each message that are returned by the server; and
  when receiving a message access request from a user, determining, by the client according to the corresponding fingerprint feature and the original URL, whether the corresponding message is displayed normally, and if yes, displaying the message to the user; otherwise, displaying the message to the user according to the corresponding alternative URL.

Optionally, the determining, by the client according to the corresponding fingerprint feature and the original URL, whether a corresponding message is displayed normally includes: accessing a corresponding message display page according to the corresponding original URL, determining whether displayed content on the message display page matches the corresponding fingerprint feature, and if yes, determining that the corresponding message is displayed normally; otherwise, determining that the corresponding message is displayed abnormally.

Optionally, the displaying the message to the user according to the corresponding alternative URL specifically includes: accessing, according to the corresponding alternative URL, the corresponding message display page cached by the server and displaying the message to the user.

In a third aspect, the present invention provides a message display method applied to a client, including:

sending, by the client, a display information obtaining request to a server, and receiving a fingerprint feature, an original URL, or an alternative URL of each message that is returned by the server;

when receiving a message access request from a user, determining, by the client, a type of a corresponding URL, and if the corresponding URL is an alternative URL, displaying the message to the user according to the corresponding alternative URL, or if the corresponding URL is an original URL, determining, according to the corresponding fingerprint feature and the original URL, whether the message is displayed normally, and if yes, displaying the message to the user; otherwise, sending an alternative-URL obtaining request to the server; and receiving, by the client, the alternative URL returned by the server, and displaying the message to the user according to the received alternative URL.

Optionally, the determining, by the client according to the corresponding fingerprint feature and the original URL, whether a corresponding message is displayed normally includes: accessing a corresponding message display page according to the corresponding original URL, determining whether displayed content on the message display page matches the corresponding fingerprint feature, and if yes, determining that the corresponding message is displayed normally; otherwise, determining that the corresponding message is displayed abnormally.

Optionally, the displaying the message to the user according to the received alternative URL specifically includes: accessing, according to the received alternative URL, the corresponding message display page cached by the server and displaying the message to the user.

In a fourth aspect, the present invention provides a message display method applied to a client, including:

sending, by the client, a display information obtaining request to a server, and receiving a fingerprint feature and an original URL of each message that are returned by the server;

when receiving a message access request from a user, determining, by the client according to the corresponding fingerprint feature and the original URL, whether the message is displayed normally, and if yes, displaying the message to the user; otherwise, sending an alternative-URL obtaining request to the server; and receiving, by the client, the alternative URL returned by the server, and displaying the message to the user according to the received alternative URL.

Optionally, the determining, by the client according to the corresponding fingerprint feature and the original URL includes: accessing a corresponding message display page according to the corresponding original URL, determining whether displayed content on the message display page matches the corresponding fingerprint feature, and if yes, determining that the corresponding message is displayed normally; otherwise, determining that the corresponding message is displayed abnormally.

Optionally, the displaying the message to the user according to the received alternative URL specifically includes: accessing, according to the received alternative URL, the corresponding message display page cached by the server and displaying the message to the user.

In a fifth aspect, the present invention provides a message display method, including:

caching, by a server, a corresponding message display page according to an original URL of each message, extracting a fingerprint feature in the message display page, and generating a corresponding alternative URL;

receiving, by the server, a display information obtaining request sent by a client, and correspondingly sending the fingerprint feature, the original URL, and the alternative URL of each message to the client; and receiving, by the client, the fingerprint feature, the original URL, and the alternative URL of each message, and when receiving a message access request from a user, determining, according to the corresponding fingerprint feature and the original URL, whether the message is displayed normally, and if yes, displaying the message to the user; otherwise, displaying the message to the user according to the corresponding alternative URL.

In a sixth aspect, the present invention provides a message display method, including:

caching, by a server, a corresponding message display page according to an original URL of each message, and generating a corresponding alternative URL;

detecting, by the server, a display status of each message at a preset time interval and marking the display status, and when receiving a display information obtaining request sent by a client, sending the original URL or the alternative URL of each message to the client according to a currently marked display status of each message; and receiving, by the client, the original URL or the alternative URL of each message, and when receiving a message access request from a user, displaying the message to the user according to the corresponding original URL or the alternative URL.

In a seventh aspect, the present invention provides a message display method, including:

caching, by a server, a corresponding message display page according to an original URL of each message, extracting a fingerprint feature in the message display page, and generating a corresponding alternative URL;

detecting, by the server, a display status of each message at a preset time interval and marking the display status, and when receiving a display information obtaining request sent by a client, sending the fingerprint feature, the original URL, or the alternative URL of each message to the client according to a currently marked display status of each message;

receiving, by the client, the fingerprint feature, the original URL, or the alternative URL of each message, and when receiving a message access request from a user, determining a type of a corresponding URL, and if the corresponding URL is an alternative URL, displaying the message to the user according to the corresponding alternative URL, or if the corresponding URL is an original URL, determining, according to the corresponding fingerprint feature and the original URL, whether the message is displayed normally, and if yes, displaying the message to the user; otherwise, sending an alternative-URL obtaining request to the server;

searching for, by the server, the corresponding alternative URL according to the received alternative-URL obtaining request, and sending the corresponding alternative URL to the client; and displaying, by the client, the message to the user according to the received alternative URL.

In an eighth aspect, the present invention provides a message display method, including:

caching, by a server, a corresponding message display page according to an original URL of each message, extracting a fingerprint feature in the message display page, and generating a corresponding alternative URL;

receiving, by the server, a display information obtaining request sent by a client, and correspondingly sending the fingerprint feature and the original URL of each message to the client;

receiving, by the client, the fingerprint feature and the original URL of each message, and when receiving a message access request from a user, determining, according to the corresponding fingerprint feature and the original URL, whether the message is displayed normally, and if yes, displaying the message to the user; otherwise, sending an alternative-URL obtaining request to the server;

searching for, by the server, the corresponding alternative URL according to the received alternative-URL obtaining request, and sending the corresponding alternative URL to the client; and displaying, by the client, the message to the user according to the received alternative URL.

In a ninth aspect, the present invention provides a message display device, including:

one or more processors, and a storage apparatus storing one or more programs, where when the one or more programs are executed by the one or more processors, the one or more processors implement the method in any of the first aspect, the second aspect, the third aspect, and the fourth aspect of the present invention.

In a tenth aspect, the present invention provides a computer readable storage medium, storing a computer program, where when the computer program is executed by a processor, the method in any of the first aspect, the second aspect, the third aspect, and the fourth aspect of the present invention is implemented.

Advantages of the present invention are as follows:

In the present invention, the server and the client can independently detect a display status of a message before the message is displayed, and can cooperate with each other to perform double detection before the message is displayed. In this way, a problem that a message in aggregated messages cannot be displayed normally on the client is effectively resolved, and all copyright risks caused by using a cached URL to access a display page of the corresponding message are avoided.

BRIEF DESCRIPTION OF THE DRAWINGS

Various other advantages and benefits will become clear to a person of ordinary skill in the art by reading the following detailed description of exemplary implementations. The accompanying drawings are merely intended to show the preferred implementations and do not constitute a limitation on the present invention. Throughout the accompanying drawings, the same reference numerals are used to represent the same components. In the accompanying drawings.

DETAILED DESCRIPTION OF THE EMBODIMENTS

The following describes in detail exemplary implementations of the present disclosure with reference to the accompanying drawings. Although the accompanying drawings show the exemplary implementations of the present disclosure, it should be understood that the present disclosure may be implemented in various manners and is not limited by the implementations described herein. Rather, these implementations are provided, so that the present disclosure is more thoroughly understood and the scope of the present disclosure is completely conveyed to a person skilled in the art.

Figure 1:
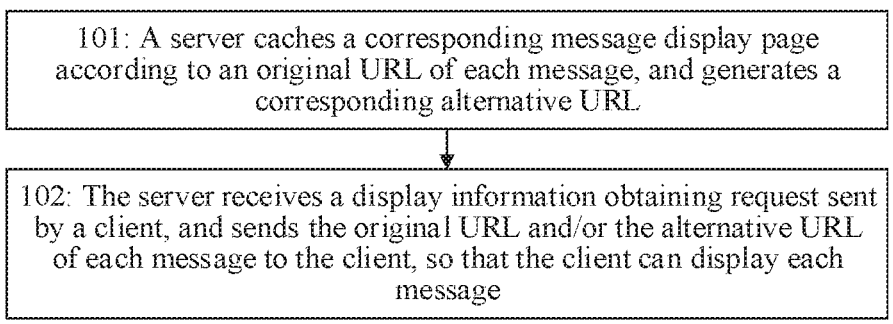
FIG. 1 is a flowchart of a message display method applied to a server according to the present invention.

According to an implementation of the present invention, as shown in FIG. 1, a message display method applied to a server is provided, including:

Step 101: The server caches a corresponding message display page according to an original URL of each message, and generates a corresponding alternative URL.

Step 102: The server receives a display information obtaining request sent by a client, and sends the original URL and/or the alternative URL of each message to the client, so that the client can display each message.

In a first preferred implementation of the present invention, the caching, by the server, a corresponding message display page according to an original URL of each message in step 101 includes: caching, by the server, the corresponding message display page according to the original URL of each message, and extracting a fingerprint feature in the message display page; and correspondingly, after the generating a corresponding alternative URL in step 101, the method further includes: correspondingly storing the alternative URL, the fingerprint feature, and the message identifier and/or the message title of each message.

Correspondingly, the sending the original URL and/or the alternative URL of each message to the client in step 102 includes: correspondingly sending the original URL and the alternative URL, and the fingerprint feature of each message to the client.

Specifically, the server generates a message list according to the original URL, the alternative URL, the fingerprint feature, the message identifier, and/or the message title of each message, and sends the message list to the client.

For example, there are a total of 80 messages, and numbers 1, 2, 3, . . . , 80 are used as message identifiers of the messages. In this case, the server generates a message list according to original URLs, alternative URLs, fingerprint features, and the message identifiers of the 80 messages, and sends the message list to the client.

In the first preferred implementation of the present invention, the server generates the alternative URL, extracts the fingerprint feature in the message display page, and sends the original URL, the alternative URL, and the fingerprint feature of each message to the client, to support the client in performing display status detection before the message is displayed, so that the client can display each message normally.

In a second preferred implementation of the present invention, after the generating a corresponding alternative URL in step 101, the method further includes: detecting, by the server, a display status of each message at a preset time interval and marking the display status.

Specifically, the server accesses the corresponding message display page according to the original URL of each message at the preset time interval, and marks the original URL, and/or a message title, and/or a message identifier of each message according to a display status of the message display page. The preset time interval may be set as required. For example, in the present invention, the preset time interval is 5 minutes. The marking the original URL, and/or a message title, and/or a message identifier of each message may be marking an original URL, and/or a message title, and/or a message identifier of a normally displayed message, or an original URL, and/or a message title, and/or a message identifier of an abnormally displayed message. This may be set as required.

Correspondingly, the sending the original URL and/or the alternative URL of each message to the client in step 102 includes: sending, by the server, the original URL or the alternative URL of each message to the client according to a currently marked display status of each message.

Specifically, the server determines, according to the currently marked display status of each message, whether there is currently an abnormally displayed message, and if yes, sends an alternative URL of the abnormally displayed message and an original URL of a normally displayed message to the client, otherwise, sends the original URL of each message to the client.

For example, there are a total of 80 messages, and numbers 1, 2, 3, . . . , 80 are used as message identifiers of the messages. The server marks a message identifier of an abnormally displayed message. When the server receives the display information obtaining request sent by the client, currently marked message identifiers are 26, 55, 67, 69, that is, there are 4 abnormally displayed messages. In this case, the server searches for corresponding four alternative URLs according to the currently marked message identifiers, and sends the found alternative URLs, and original URLs of normally displayed messages to the client.

Further, when a display status of a message detected by the server does not match a display status of a corresponding mark, the method further includes: updating the display status of the corresponding mark.

In the second preferred implementation of the present invention, the server detects the display status of each message, and sends the alternative URL of the abnormally displayed message and the original URL of the normally displayed message to the client, to provide guarantee for the client to display each message normally.

In a third preferred implementation of the present invention, based on the second preferred implementation, the caching, by the server, a corresponding message display page according to an original URL of each message in step 101 includes: caching, by the server, the corresponding message display page according to the original URL of each message, and extracting a fingerprint feature in the message display page; and correspondingly, after the generating a corresponding alternative URL in step 101, the method further includes: correspondingly storing the alternative URL, the fingerprint feature, and the message identifier and/or the message title of each message.

Correspondingly, the sending the original URL or the alternative URL of each message to the client includes: correspondingly sending the original URL or the alternative URL of each message, and the fingerprint feature to the client.

Specifically, the server generates a message list according to the original URL or the alternative URL, a URL identifier, the fingerprint feature, the message identifier, and/or the message title of each message, and sends the message list to the client. The URL identifier includes a first preset identifier and a second preset identifier, respectively identifying the alternative URL and the original URL. For example, the first preset identifier is 1 and the second preset identifier is 0.

For example, there are a total of 80 messages, and numbers 1, 2, 3, . . . , 80 are used as message identifiers of the messages. The server marks a message identifier of an abnormally displayed message. When the server receives the display information obtaining request sent by the client, currently marked message identifiers are 26, 55, 67, 69, that is, there are 4 abnormally displayed messages. In this case, the server searches for corresponding four alternative URLs according to the currently marked message identifiers, generates a message list according to the found alternative URLs, original URLs and URL identifiers of normally displayed messages, fingerprint features of the messages, and message identifiers of the messages, and sends the message list to the client.

Further, this implementation further includes: receiving, by the server, an alternative-URL obtaining request sent by the client, searching for the corresponding alternative URL according to the received alternative-URL obtaining request, and sending the corresponding alternative URL to the client.

Specifically, the server searches for a corresponding cached URL according to a message title and/or a message identifier included in a received request for obtaining the cached URL, and sends the found cached URL to the client.

In the third preferred implementation of the present invention, the server detects the display status of each message, and sends the original URL or the alternative URL of each message, and the fingerprint feature to the client, so that the client performs detection again before displaying the message. In this way, normal display of the message is effectively ensured through double detection.

In a fourth preferred implementation of the present invention, the caching, by the server, a corresponding message display page according to an original URL of each message in step 101 includes: caching, by the server, the corresponding message display page according to the original URL of each message, and extracting a fingerprint feature in the message display page; and correspondingly, after the generating a corresponding alternative URL in step 101, the method further includes: correspondingly storing the alternative URL, the fingerprint feature, and the message identifier and/or the message title of each message.

Correspondingly, the sending the original URL and/or the alternative URL of each message to the client in step 102 includes: correspondingly sending the original URL and the fingerprint feature of each message to the client.

Preferably, the server generates a message list according to the alternative URL, the fingerprint feature, the message identifier, and/or the message title of each message, and sends the message list to the client.

For example, in this embodiment, there are a total of 80 messages, and numbers 1, 2, 3, . . . , 80 are used as message identifiers of the messages. In this case, the server generates a message list according to alternative URLs, fingerprint features, and the message identifiers of the 80 messages, and sends the message list to the client.

Further, this implementation further includes: receiving, by the server, an alternative-URL obtaining request sent by the client, searching for the corresponding alternative URL according to the received alternative-URL obtaining request, and sending the corresponding alternative URL to the client.

Specifically, the server searches for a corresponding cached URL according to a message title and/or a message identifier included in a received request for obtaining the cached URL, and sends the found cached URL to the client.

In the fourth preferred implementation of the present invention, the server sends the fingerprint feature and the original URL of each message to the client, so that the client can detect the display status before displaying the message, and when detecting that the message is displayed abnormally, obtain the alternative URL from the server, to ensure normal display of the message.

Figure 2:
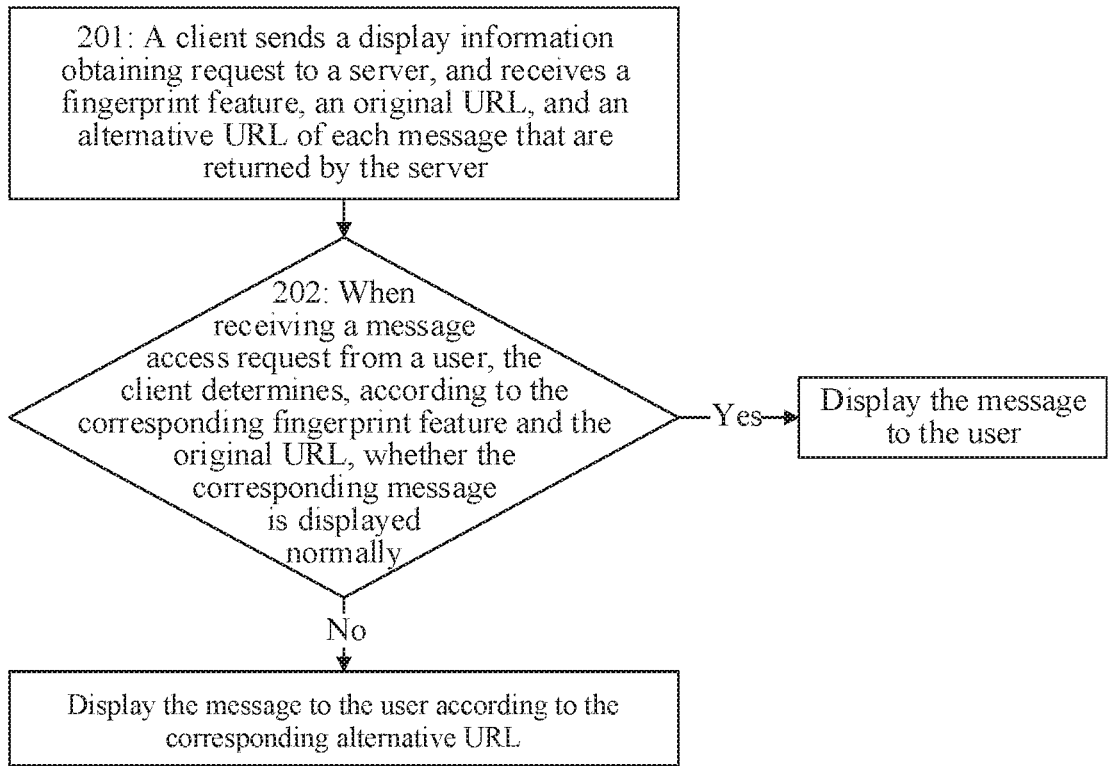
FIG. 2 is a first flowchart of a message display method applied to a client according to the present invention.

According to an implementation of the present invention, as shown in FIG. 2, a message display method applied to a client is further provided, including:

Step 201: The client sends a display information obtaining request to a server, and receives a fingerprint feature, an original URL, and an alternative URL of each message that are returned by the server.

Specifically, when receiving a message aggregation page access request from a user, the client sends the display information obtaining request to the server.

Step 202: When receiving a message access request from a user, the client determines, according to the corresponding fingerprint feature and the original URL, whether the corresponding message is displayed normally, and if yes, displaying the message to the user; otherwise, displaying the message to the user according to the corresponding alternative URL.

The determining, by the client according to the corresponding fingerprint feature and the original URL includes: accessing a corresponding message display page according to the corresponding original URL, determining whether displayed content on the message display page matches the corresponding fingerprint feature, and if yes, determining that the corresponding message is displayed normally; otherwise, determining that the corresponding message is displayed abnormally.

For example, the message access request received by the client from the user is a message corresponding to a message identifier 68, and a corresponding message display page is accessed according to an original URL corresponding to the message identifier 68. Content displayed on the message display page is "the corresponding page cannot be found", and does not match a fingerprint feature "short track speed skating" corresponding to the message identifier 68. In this case, it is determined that the message is displayed abnormally, and the message is displayed to the user through an alternative URL corresponding to the message identifier 68.

Further, the displaying the message to the user according to the corresponding alternative URL specifically includes: accessing, by the client according to the alternative URL, the corresponding message display page cached by the server and displaying the message to the user.

In this implementation, the client detects the display status before the message is displayed according to the fingerprint feature and the original URL of each message that are returned by the server, and displays an abnormally displayed message according to the corresponding alternative URL, thereby avoiding a situation of displaying the abnormally displayed message to the user.

Figure 3:
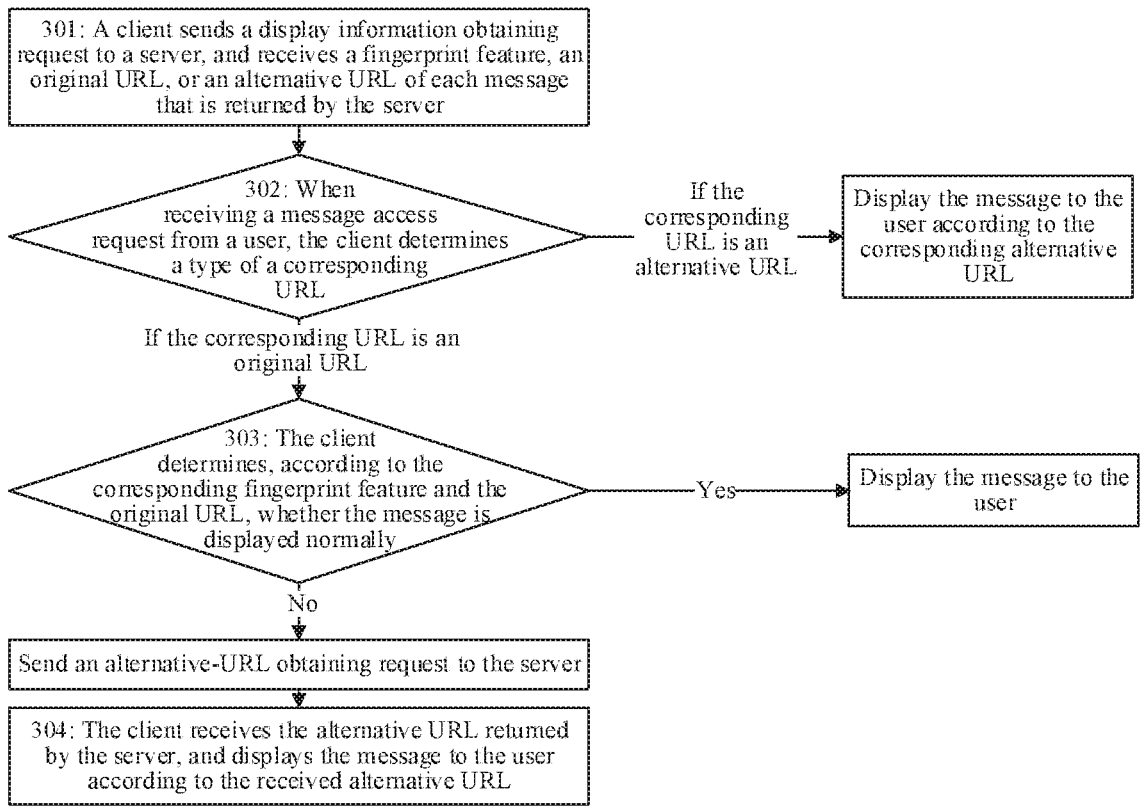
FIG. 3 is a second flowchart of a message display method applied to a client according to the present invention.

According to an implementation of the present invention, as shown in FIG. 3, a message display method applied to a client is further provided, including:

Step 301: The client sends a display information obtaining request to a server, and receives a fingerprint feature, an original URL, or an alternative URL of each message that is returned by the server.

Specifically, when receiving a message aggregation page access request from a user, the client sends the display information obtaining request to the server.

Preferably, the client receives a message list returned by the server, and the message list includes the original URL or the alternative URL, an URL identifier, the fingerprint feature, a message identifier, and/or a message title of each message.

Step 302: When receiving a message access request from a user, the client determines a type of a corresponding URL, and if the corresponding URL is an alternative URL, displays the message to the user according to the corresponding alternative URL, or if the corresponding URL is an original URL, performs step 303.

The determining a type of a corresponding URL includes: determining a URL identifier type of the corresponding URL, and if the URL identifier type is a first preset identifier, determining the corresponding URL as an alternative URL, or if the URL identifier type is a second preset identifier, determining the corresponding URL as an original URL.

The first preset identifier is, for example, 1, and the second preset identifier is, for example, 0.

For example, the message access request received by the client from the user is a message corresponding to a message identifier 30, and it is determined, according to a URL identifier "0" corresponding to the message identifier 30, that the corresponding URL is an original URL.

Step 303: The client determines, according to the corresponding fingerprint feature and the original URL, whether the message is displayed normally, and if yes, displays the message to the user; otherwise, sends an alternative-URL obtaining request to the server.

The determining, by the client according to the corresponding fingerprint feature and the original URL includes: accessing, by the client, a corresponding message display page according to the corresponding original URL, determining whether displayed content on the message display page matches the corresponding fingerprint feature, and if yes, determining that the corresponding message is displayed normally; otherwise, determining that the corresponding message is displayed abnormally.

The sending an alternative-URL obtaining request to the server includes: generating the alternative-URL obtaining request including the message identifier and/or the message title, and sending the alternative-URL obtaining request to the server.

For example, the client accesses a corresponding message display page according to an original URL corresponding to the message identifier 30. Content displayed on the message display page is "the corresponding page cannot be found", and does not match a fingerprint feature "short track speed skating" corresponding to the message identifier. In this case, it is determined that the message is displayed abnormally, and an alternative-URL obtaining request including the message identifier 30 is generated and is sent to the server.

Step 304: The client receives the alternative URL returned by the server, and displays the message to the user according to the received alternative URL.

The displaying the message to the user according to the alternative URL specifically includes: accessing, according to the alternative URL, the corresponding message display page cached by the server and displaying the message to the user.

In this embodiment, through double detection of the server and the client, normal display of a message is effectively ensured.

Figure 4:
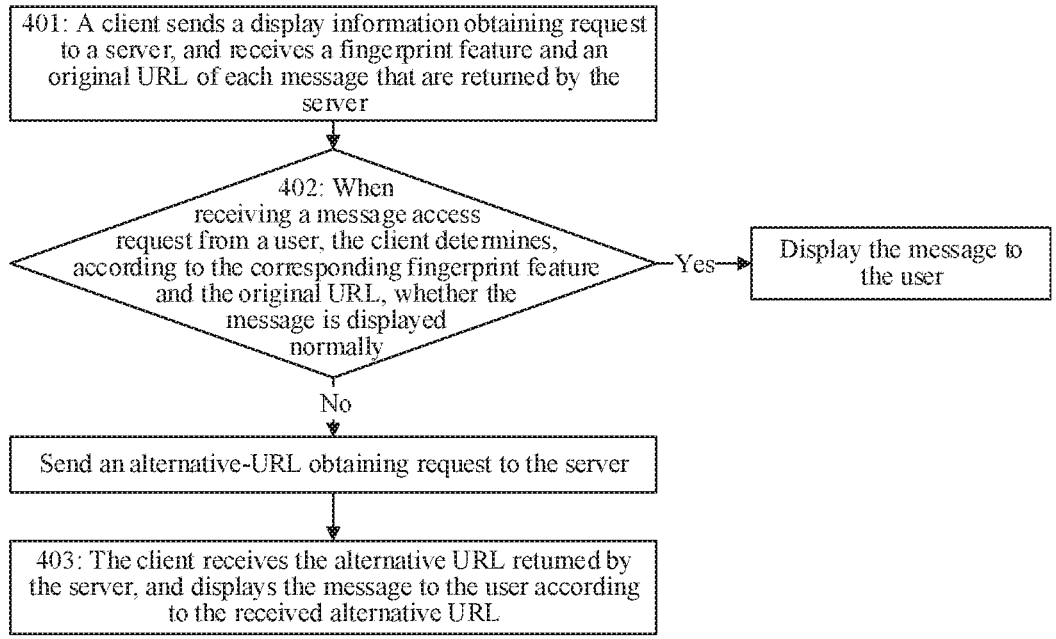
FIG. 4 is a third flowchart of a message display method applied to a client according to the present invention.

According to an implementation of the present invention, as shown in FIG. 4, a message display method applied to a client is further provided, including:

Step 401: The client sends a display information obtaining request to a server, and receives a fingerprint feature and an original URL of each message that are returned by the server.

Preferably, the client receives a message list returned by the server, and the message list includes an alternative URL, the fingerprint feature, a message identifier, and/or a message title of each message.

Step 402: When receiving a message access request from a user, the client determines, according to the corresponding fingerprint feature and the original URL, whether the message is displayed normally, and if yes, displays the message to the user; otherwise, sends an alternative-URL obtaining request to the server.

The determining, by the client according to the corresponding fingerprint feature and the original URL includes: accessing a corresponding message display page according to the corresponding original URL, determining whether displayed content on the message display page matches the corresponding fingerprint feature, and if yes, determining that the corresponding message is displayed normally; otherwise, determining that the corresponding message is displayed abnormally.

Further, the sending an alternative-URL obtaining request to the server includes: generating the alternative-URL obtaining request including the message identifier and/or the message title, and sending the alternative-URL obtaining request to the server.

For example, the message access request received by the client from the user is a message corresponding to a message identifier 30, and a corresponding message display page is accessed according to an original URL corresponding to the message identifier 30. Content displayed on the message display page is "the corresponding page cannot be found", and does not match a fingerprint feature "short track speed skating" corresponding to the message identifier 30. In this case, it is determined that the message is displayed abnormally, and an alternative-URL obtaining request including the message identifier 30 is generated and is sent to the server.

Step 403: The client receives the alternative URL returned by the server, and displays the message to the user according to the received alternative URL.

The displaying the message to the user according to the received alternative URL specifically includes: accessing, according to the received alternative URL, the corresponding message display page cached by the server and displaying the message to the user.

Figure 5:
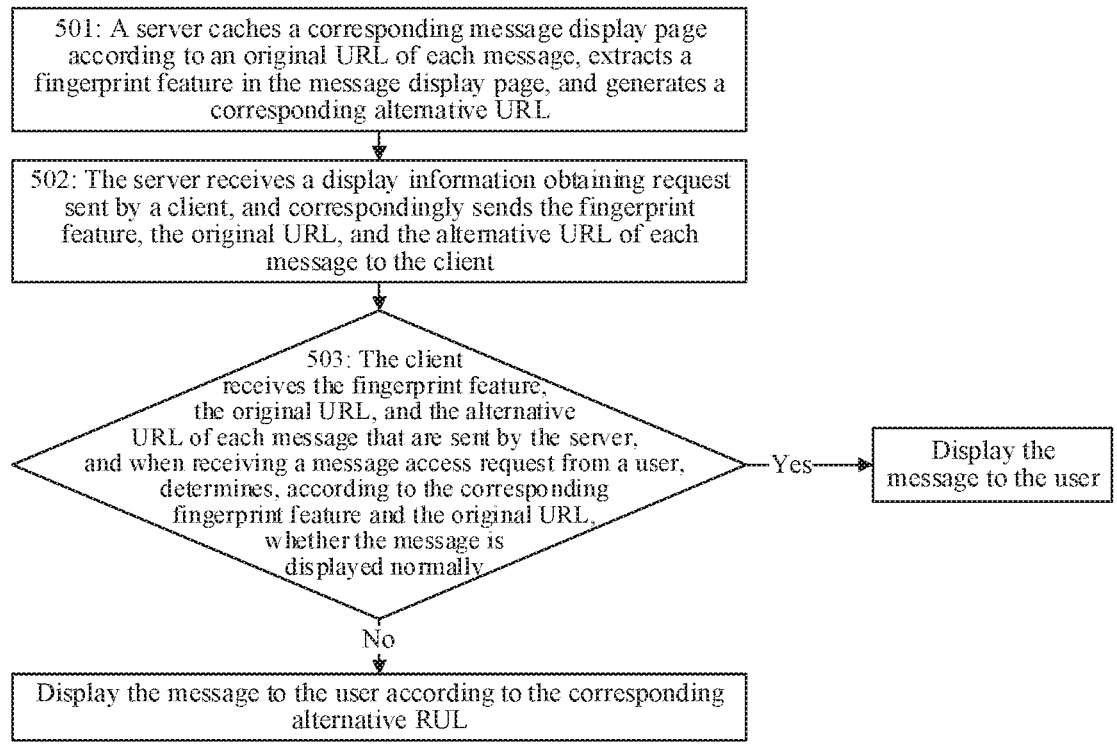
FIG. 5 is a first flowchart of a message display method according to the present invention.

According to an implementation of the present invention, as shown in FIG. 5, a message display method is further provided, including:

Step 501: A server caches a corresponding message display page according to an original URL of each message, extracts a fingerprint feature in the message display page, and generates a corresponding alternative URL.

Step 502: The server receives a display information obtaining request sent by a client, and correspondingly sends the fingerprint feature, the original URL, and the alternative URL of each message to the client.

For example, there are a total of 80 messages, and numbers 1, 2, 3, . . . , 80 are used as message identifiers of the messages. In this case, the server sends fingerprint features, original URLs, alternative URLs, and the message identifiers of the 80 messages to the client.

Step 503: The client receives the fingerprint feature, the original URL, and the alternative URL of each message that are sent by the server, and when receiving a message access request from a user, determines, according to the corresponding fingerprint feature and the original URL, whether the message is displayed normally, and if yes, displays the message to the user; otherwise, displays the message to the user according to the corresponding alternative URL.

For example, the message access request received by the client from the user is a message corresponding to a message identifier 68, and a corresponding message display page is accessed according to an original URL corresponding to the message identifier 68. Content displayed on the message display page is "the corresponding page cannot be found", and does not match a fingerprint feature "short track speed skating" corresponding to the message identifier 68. In this case, it is determined that the message is displayed abnormally, and the message is displayed to the user through an alternative URL corresponding to the message identifier 68.

In this implementation, before displaying the message, the client detects the display status of the message according to data sent by the server, thereby effectively avoiding a phenomenon of displaying an abnormally displayed message to the user.

Figure 6:
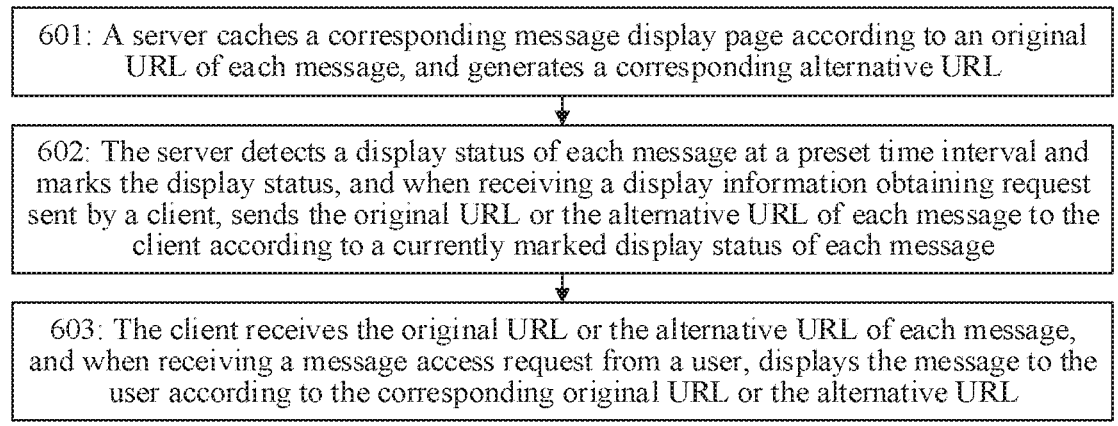
FIG. 6 is a second flowchart of a message display method according to the present invention.

According to an implementation of the present invention, as shown in FIG. 6, a message display method is further provided, including:

Step 601: A server caches a corresponding message display page according to an original URL of each message, and generates a corresponding alternative URL.

Step 602: The server detects a display status of each message at a preset time interval and marks the display status, and when receiving a display information obtaining request sent by a client, sends the original URL or the alternative URL of each message to the client according to a currently marked display status of each message.

For example, there are a total of 80 messages, and numbers 1, 2, 3, . . . , 80 are used as message identifiers of the messages. The server marks a message identifier of an abnormally displayed message. When the server receives the display information obtaining request sent by the client, currently marked message identifiers are 26, 55, 67, 69, that is, there are 4 abnormally displayed messages. In this case, the server searches for corresponding four alternative URLs according to the currently marked message identifiers, and sends the found alternative URLs, and original URLs of normally displayed messages to the client.

Step 603: The client receives the original URL or the alternative URL of each message, and when receiving a message access request from a user, displays the message to the user according to the corresponding original URL or the alternative URL.

In this embodiment, the server detects the display status of each message, and provides an alternative URL of an abnormally displayed message to the client, so that the client can display each message normally.

Figure 7:
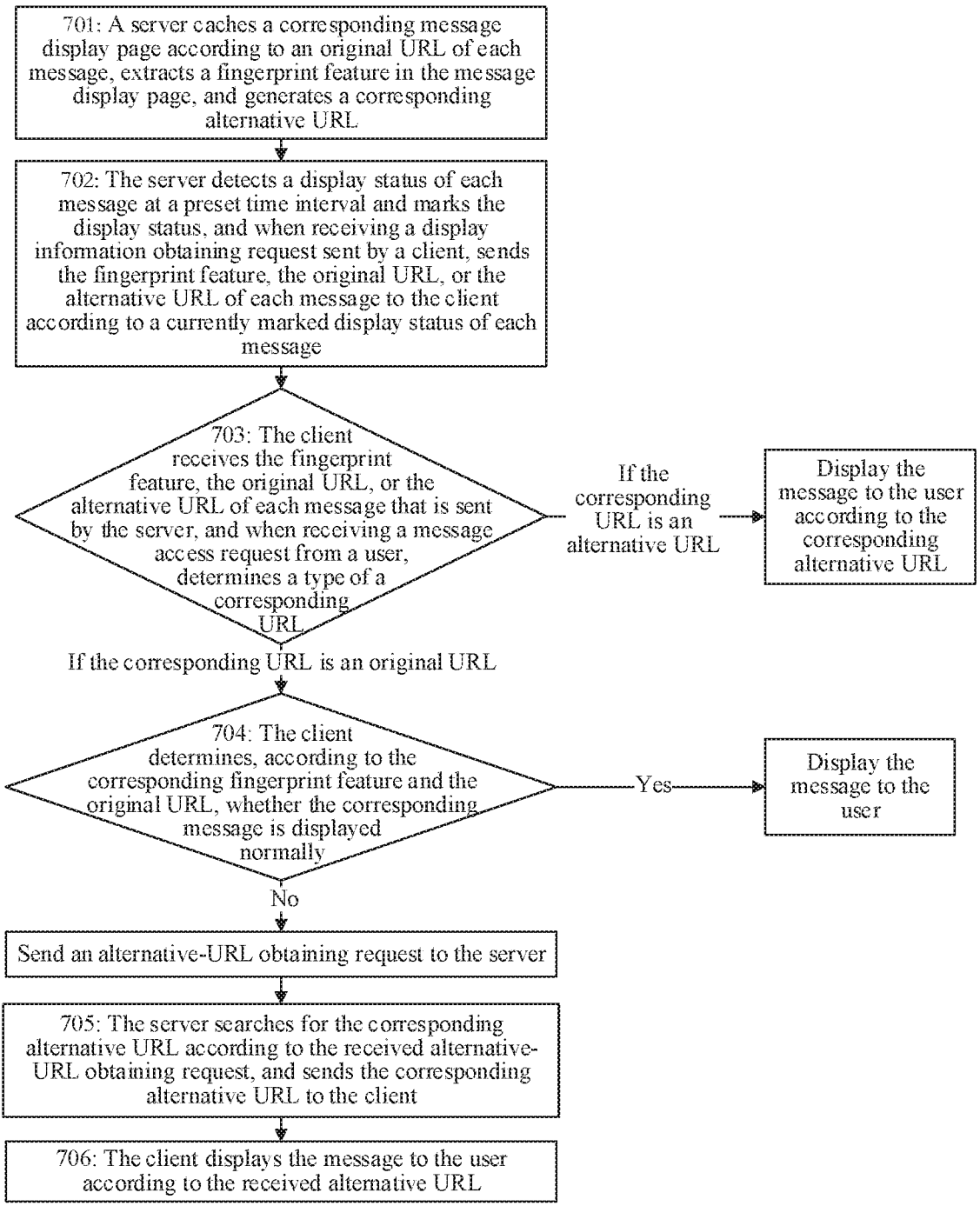
FIG. 7 is a third flowchart of a message display method according to the present invention.

According to an implementation of the present invention, as shown in FIG. 7, a message display method is further provided, including:

Step 701: A server caches a corresponding message display page according to an original URL of each message, extracts a fingerprint feature in the message display page, and generates a corresponding alternative URL.

Step 702: The server detects a display status of each message at a preset time interval and marks the display status, and when receiving a display information obtaining request sent by a client, sends the fingerprint feature, the original URL, or the alternative URL of each message to the client according to a currently marked display status of each message.

For example, there are a total of 80 messages, and numbers 1, 2, 3, . . . , 80 are used as message identifiers of the messages. The server marks a message identifier of an abnormally displayed message. When the server receives the display information obtaining request sent by the client, currently marked message identifiers are 26, 55, 67, 69, that is, there are 4 abnormally displayed messages. In this case, the server searches for corresponding four alternative URLs according to the currently marked message identifiers, and sends the found alternative URLs, original URLs and URL identifiers of normally displayed messages, fingerprint features of the messages, and message identifiers and/or message titles of the messages to the client.

Step 703: The client receives the fingerprint feature, the original URL, or the alternative URL of each message that is sent by the server, and when receiving a message access request from a user, determines a type of a corresponding URL, and if the corresponding URL is an alternative URL, displays the message to the user according to the corresponding alternative URL, or if the corresponding URL is an original URL, performs step 704.

For example, the message access request received by the client from the user is a message corresponding to a message identifier 30, and it is determined, according to a URL identifier "0" corresponding to the message identifier 30, that the corresponding URL is an original URL.

Step 704: The client determines, according to the corresponding fingerprint feature and the original URL, whether the corresponding message is displayed normally, and if yes, displays the message to the user; otherwise, sends an alternative-URL obtaining request to the server.

For example, the client accesses a corresponding message display page according to an original URL corresponding to the message identifier 30. Content displayed on the message display page is "the corresponding page cannot be found", and does not match a fingerprint feature "short track speed skating" corresponding to the message identifier 30. In this case, it is determined that the message is displayed abnormally, and an alternative-URL obtaining request including the message identifier 30 is generated and is sent to the server.

Step 705: The server searches for the corresponding alternative URL according to the received alternative-URL obtaining request, and sends the corresponding alternative URL to the client.

For example, the server searches for the corresponding alternative URL according to the message identifier 30 included in the received alternative-URL obtaining request, and returns the corresponding alternative URL to the client.

Step 706: The client displays the message to the user according to the received alternative URL.

For example, the client displays the message corresponding to the message identifier 30 to the user according to the received alternative URL.

Figure 8:
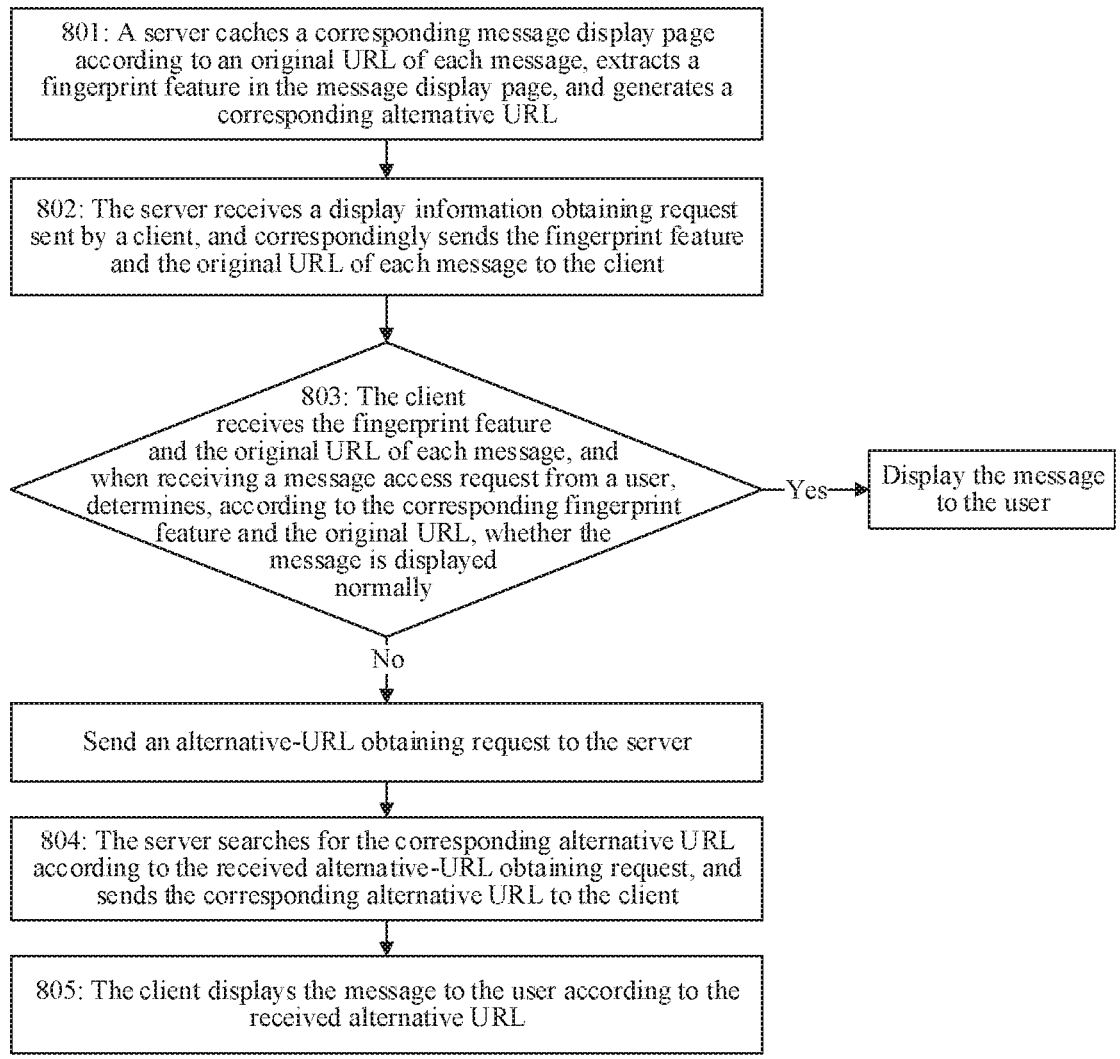
FIG. 8 is a fourth flowchart of a message display method according to the present invention.

According to an implementation of the present invention, as shown in FIG. 8, a message display method is further provided, including:

Step 801: A server caches a corresponding message display page according to an original URL of each message, extracts a fingerprint feature in the message display page, and generates a corresponding alternative URL.

Step 802: The server receives a display information obtaining request sent by a client, and correspondingly sends the fingerprint feature and the original URL of each message to the client.

For example, there are a total of 80 messages, and numbers 1, 2, 3, . . . , 80 are used as message identifiers of the messages. In this case, the server sends fingerprint features, original URLs, and the message identifiers of the 80 messages to the client.

Step 803: The client receives the fingerprint feature and the original URL of each message, and when receiving a message access request from a user, determines, according to the corresponding fingerprint feature and the original URL, whether the message is displayed normally, and if yes, displays the message to the user; otherwise, sends an alternative-URL obtaining request to the server.

For example, the message access request received by the client from the user is a message corresponding to a message identifier 30, and a corresponding message display page is accessed according to an original URL corresponding to the message identifier 30. Content displayed on the message display page is "the corresponding page cannot be found", and does not match a fingerprint feature "short track speed skating" corresponding to the message identifier 30. In this case, it is determined that the message is displayed abnormally, and an alternative-URL obtaining request including the message identifier 30 is generated and is sent to the server.

Step 804: The server searches for the corresponding alternative URL according to the received alternative-URL obtaining request, and sends the corresponding alternative URL to the client.

For example, the server searches for the corresponding alternative URL according to the message identifier 30 included in the received alternative-URL obtaining request, and returns the corresponding alternative URL to the client.

Step 805: The client displays the message to the user according to the received alternative URL.

For example, the client displays the message corresponding to the message identifier 30 to the user according to the received alternative URL.

According to an implementation of the present invention, a message display device is further provided, including: one or more processors, and a storage apparatus storing one or more programs, where when the one or more programs are executed by the one or more processors, the one or more processors implement the steps of the above message display method.

According to an implementation of the present invention, a computer readable storage medium is further provided, storing a computer program, where when the computer program is executed by a processor, the steps of the above message display method are implemented.

In the present invention, the server and the client can independently detect a display status of a message before the message is displayed, and can cooperate with each other to perform double detection before the message is displayed. In this way, a problem that a message in aggregated messages cannot be displayed normally on the client is effectively resolved, and all copyright risks caused by using a cached URL to access a display page of the corresponding message are avoided.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A message display method applied to a server, comprising:
    caching, by the server, a corresponding message display page according to an original Uniform Resource Locator (URL) of each message, and generating a corresponding alternative URL; and
    receiving, by the server, a display information obtaining request sent by a client, and sending the original URL and/or the corresponding alternative URL of the each message to the client for the client to display the each message.

2. The message display method according to claim 1, wherein
    the step of caching, by the server, the corresponding message display page according to the original URL of the each message comprises:
        caching, by the server, the corresponding message display page according to the original URL of the each message, and extracting a fingerprint feature in the corresponding message display page; and
    the step of sending the original URL and/or the corresponding alternative URL of the each message to the client comprises:
        correspondingly sending the original URL and the corresponding alternative URL, and the fingerprint feature of the each message to the client.

3. The message display method according to claim 2, wherein after generating the corresponding alternative URL, the message display method further comprises:
    correspondingly storing the corresponding alternative URL, the fingerprint feature, and a message identifier and/or a message title of the each message.

4. The message display method according to claim 1, wherein after generating the corresponding alternative URL, the message display method further comprises:
    detecting, by the server, a display status of the each message at a preset time interval and marking the display status; and
    the step of sending the original URI, and/or the corresponding alternative URI, of the each message to the client comprises:
        sending, by the server, the original URI, or the corresponding alternative URL of the each message to the client according to a currently marked display status of the each message.

5. The message display method according to claim 4, wherein
    the step of detecting, by the server, the display status of the each message at the preset time interval and marking the display status comprises:
        accessing, by the server, the corresponding message display page according to the original URI- of the each message at the preset time interval, and
        marking the original URL, and/or a message title, and/or a message identifier of the each message according to a display status of the corresponding message display page.

6. The message display method according to claim 4, wherein
    the step of caching, by the server, the corresponding message display page according to the original URL of the each message comprises:
        caching, by the server, the corresponding message display page according to the original URL of the each message, and extracting a fingerprint feature in the corresponding message display page; and
    the step of sending the original URL or the corresponding alternative URL of the each message to the client comprises:
        correspondingly sending the original URL or the corresponding alternative URL of the each message, and the fingerprint feature to the client.

7. The message display method according to claim 6, further comprising:
    receiving, by the server, an alternative-URL obtaining request sent by the client, searching for the corresponding alternative URL according to the alternative-URL obtaining request, and sending the corresponding alternative URL to the client.

8. The message display method according to claim 1, wherein
    the step of caching, by the server, the corresponding message display page according to the original URL of the each message comprises:
        caching, by the server, the corresponding message display page according to the original URL of the each message, and extracting a fingerprint feature in the corresponding message display page; and
    the step of sending the original URL and/or the corresponding alternative URL of the each message to the client comprises:
        correspondingly sending the original URL of the each message and the fingerprint feature to the client.

9. A message display method applied to a client, comprising:
    sending, by the client, a display information obtaining request to a server, and receiving a fingerprint feature, an original URL, and an alternative URL of each message that are returned by the server; and
    when receiving a message access request from a user, determining, by the client, according to a corresponding fingerprint feature and the original URL, whether a corresponding message is displayed normally, and
    if the corresponding message is displayed normally, displaying the corresponding message to the user; if the corresponding message is displayed abnormally, displaying the corresponding message to the user according to a corresponding alternative URL;

wherein the step of determining by the client, according to the corresponding fingerprint feature and the original URL, whether a corresponding message is displayed normally comprises:

accessing a corresponding message display page according to a corresponding original URL, determining whether displayed content on the corresponding message display page matches the corresponding fingerprint feature, and if the displayed content on the corresponding message display page matches the corresponding fingerprint feature, determining that a corresponding message is displayed normally; if the displayed content on the corresponding message display page does not match the corresponding fingerprint feature, determining that the corresponding message is displayed abnormally.

10. The message display method according to claim 9, wherein the step of determining, by the client, according to the corresponding fingerprint feature and the original URL, whether a corresponding message is displayed normally comprises:

accessing a corresponding message display page according to a corresponding original URL;

determining whether displayed content on the corresponding message display page matches the corresponding fingerprint feature, and if the displayed content on the corresponding message display page matches the corresponding fingerprint feature, determining the corresponding message is displayed normally; if the displayed content on the corresponding message display page does not match the corresponding fingerprint feature, determining the corresponding message is displayed abnormally.

11. The message display method according to claim 9, wherein the step of displaying the corresponding message to the user according to the corresponding alternative URL specifically comprises:

accessing, according to the corresponding alternative URL, a corresponding message display page cached by the server and displaying the corresponding message to the user.

12. A message display method applied to a client, comprising:

sending, by the client, a display information obtaining request to a server, and receiving a fingerprint feature, an original URL, or an alternative URL of each message that is returned by the server;

when receiving a message access request from a user, determining, by the client, a type of a corresponding URL, and if the corresponding URL is the alternative URL, displaying a message to the user according to a corresponding alternative URL, or if the corresponding URL is the original URL, determining, according to a corresponding fingerprint feature and the original URL, whether the message is displayed normally, and if the message is displayed normally, displaying the message to the user;

if the message is displayed abnormally, sending an alternative-URL obtaining request to the server; and receiving, by the client, the alternative URL returned by the server, and displaying the message to the user according to a received alternative URL;

wherein the step of determining, by the client, according to the corresponding fingerprint feature and the original URL, whether a corresponding message is displayed normally comprises:

accessing a corresponding message display page according to a corresponding original URL, determining whether displayed content on the corresponding message display me matches the corresponding fingerprint feature, and if the displayed content on the corresponding message display page matches the corresponding fingerprint feature, determining that a corresponding message is displayed normally, if the displayed content on the corresponding message display page does not match the corresponding fingerprint feature, determining that the corresponding message is displayed abnormally.

13. The message display method according to claim 12, wherein the step of displaying the message to the user according to the received alternative URL specifically comprises:

accessing, according to the received alternative URL, a corresponding message display page cached by the server and displaying the message to the user.

* * * * *